US008556708B2

(12) United States Patent
Hornik et al.

(10) Patent No.: US 8,556,708 B2

(45) Date of Patent: Oct. 15, 2013

(54) WAGERING GAME WITH PLAYER-DETERMINED SYMBOL FUNCTION

(75) Inventors: Jeremy Hornik, Chicago, IL (US); Joel R. Jaffe, Glenview, IL (US); Dion Aoki, Henderson, NV (US); James Poole, Chalfont St. Giles (GB)

(73) Assignee: WMS Gaming Inc., Waukegan, IL (US)

( * ) Notice: Subject to any disclaimer, the term of this patent is extended or adjusted under 35 U.S.C. 154(b) by 2636 days.

(21) Appl. No.: 11/331,611

(22) Filed: Jan. 13, 2006

(65) Prior Publication Data

US 2006/0160613 A1 Jul. 20, 2006

Related U.S. Application Data

(60) Provisional application No. 60/644,223, filed on Jan. 14, 2005.

(51) Int. Cl.

*A63F 9/24* (2006.01)

*G06F 17/00* (2006.01)

(52) U.S. Cl.

USPC .................... 463/25; 463/20; 463/21; 463/27

(58) Field of Classification Search

USPC ................................................ 463/21, 25, 27

See application file for complete search history.

(56) References Cited

U.S. PATENT DOCUMENTS

| | | | |
|---|---|---|---|
| 4,099,722 A | 7/1978 | Rodesch et al. | |
| 4,200,291 A | 4/1980 | Hooker | |
| 4,454,670 A | 6/1984 | Bachmann et al. | 194/350 |
| 4,517,558 A | 5/1985 | Davids | 340/700 |
| 4,636,951 A | 1/1987 | Harlick | 463/25 |
| 4,695,053 A | 9/1987 | Vazquez, Jr. et al. | |
| 4,718,672 A | 1/1988 | Okada | 273/143 R |
| 5,019,973 A * | 5/1991 | Wilcox et al. | 463/13 |
| RE34,244 E | 5/1993 | Hagiwara | |
| 5,393,061 A | 2/1995 | Manship et al. | 273/143 R |
| 5,564,700 A | 10/1996 | Celona | |
| 5,580,055 A | 12/1996 | Hagiwara | 273/143 R |

(Continued)

FOREIGN PATENT DOCUMENTS

| | | |
|---|---|---|
| EP | 58488 A1 | 8/1982 |
| EP | 0 060 019 A1 | 9/1982 |

(Continued)

OTHER PUBLICATIONS

"Bigfoot" Product Sheet, Shuffle Master, Inc., 1 page (2000).

(Continued)

*Primary Examiner* — Lawrence Galka

(74) *Attorney, Agent, or Firm* — Nixon Peabody LLP

(57) ABSTRACT

A method for playing a wagering game. The method includes conducting a basic game having a randomly selected outcome. The randomly selected outcome is selected from a plurality of outcomes and is indicated by a plurality of symbols. Each of the plurality of symbols has a first function. A side-wager option is presented that allows a player to change a function of a certain one of the plurality of symbols to one of a plurality of second functions. In response to the player selecting the side-wager option, one of the plurality of second functions is selected. Also, the second function is attributed to the certain one of the plurality of symbols when the randomly selected outcome is indicated.

21 Claims, 7 Drawing Sheets

(56) References Cited

U.S. PATENT DOCUMENTS

| | | | | |
|---|---|---|---|---|
| 5,697,843 | A | 12/1997 | Manship et al. | 463/20 |
| 5,704,835 | A | 1/1998 | Dietz, II | |
| 5,720,662 | A | 2/1998 | Holmes, Jr. et al. | |
| 5,752,881 | A | 5/1998 | Inoue | 273/143 R |
| 5,769,716 | A | 6/1998 | Saffari et al. | 463/20 |
| 5,807,172 | A | 9/1998 | Piechowiak | |
| 5,951,397 | A | 9/1999 | Dickinson | 463/36 |
| 5,980,384 | A | 11/1999 | Barrie | 463/16 |
| 6,027,115 | A | 2/2000 | Griswold et al. | 273/143 R |
| 6,036,188 | A | 3/2000 | Gomez et al. | 273/118 R |
| 6,038,188 | A | 3/2000 | Akamatsu | 365/226 |
| 6,056,642 | A | 5/2000 | Bennett | 463/20 |
| 6,068,552 | A | 5/2000 | Walker et al. | |
| 6,089,977 | A | 7/2000 | Bennett | 463/20 |
| 6,095,921 | A | 8/2000 | Walker et al. | 463/20 |
| 6,110,041 | A | 8/2000 | Walker et al. | |
| 6,117,013 | A | 9/2000 | Eiba | |
| 6,135,884 | A | 10/2000 | Hedrick et al. | 463/20 |
| 6,135,885 | A | 10/2000 | Lermusiaux | 463/20 |
| 6,159,096 | A | 12/2000 | Yoseloff | |
| 6,164,645 | A | 12/2000 | Weiss | 273/138.2 |
| 6,190,254 | B1 * | 2/2001 | Bennett | 463/13 |
| 6,203,429 | B1 * | 3/2001 | Demar et al. | 463/20 |
| 6,224,482 | B1 | 5/2001 | Bennett | 463/20 |
| 6,224,484 | B1 | 5/2001 | Okuda et al. | |
| 6,227,971 | B1 | 5/2001 | Weiss | 463/20 |
| 6,241,607 | B1 | 6/2001 | Payne et al. | 463/20 |
| 6,251,013 | B1 | 6/2001 | Bennett | 463/13 |
| 6,254,483 | B1 * | 7/2001 | Acres | 463/26 |
| 6,261,177 | B1 | 7/2001 | Bennett | 463/16 |
| 6,270,411 | B1 | 8/2001 | Gura et al. | 463/20 |
| 6,290,600 | B1 | 9/2001 | Glasson | 463/20 |
| 6,350,199 | B1 | 2/2002 | Williams et al. | |
| 6,364,766 | B1 | 4/2002 | Anderson et al. | 463/16 |
| 6,364,767 | B1 * | 4/2002 | Brossard et al. | 463/20 |
| 6,368,216 | B1 | 4/2002 | Hedrick et al. | 463/20 |
| 6,375,568 | B1 | 4/2002 | Roffman et al. | 463/26 |
| 6,409,602 | B1 | 6/2002 | Wiltshire et al. | 463/42 |
| 6,419,579 | B1 | 7/2002 | Bennett et al. | 463/20 |
| 6,517,432 | B1 | 2/2003 | Jaffe | 463/16 |
| 6,517,433 | B2 | 2/2003 | Loose et al. | 463/20 |
| 6,520,856 | B1 | 2/2003 | Walker et al. | |
| 6,731,313 | B1 * | 5/2004 | Kaminkow | 715/839 |
| 6,855,054 | B2 | 2/2005 | White et al. | 463/21 |
| 6,939,223 | B1 | 9/2005 | Jones | |
| 6,939,226 | B1 | 9/2005 | Joshi | |
| 6,960,136 | B2 | 11/2005 | Joshi et al. | |
| 6,974,385 | B2 | 12/2005 | Joshi et al. | |
| 7,377,850 | B2 * | 5/2008 | Shackelford et al. | 463/20 |
| 2002/0052233 | A1 | 5/2002 | Gauselmann | 463/20 |
| 2002/0077165 | A1 | 6/2002 | Bansemer et al. | 463/7 |
| 2002/0132659 | A1 * | 9/2002 | DeMar et al. | 463/16 |
| 2002/0142825 | A1 | 10/2002 | Lark et al. | |
| 2002/0142846 | A1 | 10/2002 | Paulsen | |
| 2003/0003988 | A1 | 1/2003 | Walker et al. | |
| 2003/0054874 | A1 | 3/2003 | Kaminkow | 463/20 |
| 2003/0057645 | A1 | 3/2003 | Baerlocher | 273/138.2 |
| 2003/0060267 | A1 | 3/2003 | Glavich | 463/20 |
| 2003/0157981 | A1 | 8/2003 | Marks et al. | 463/20 |
| 2004/0043809 | A1 | 3/2004 | Gomez et al. | 463/16 |
| 2004/0053672 | A1 | 3/2004 | Baerlocher | |
| 2004/0097279 | A1 | 5/2004 | Gauselmann | |
| 2004/0097280 | A1 | 5/2004 | Gauselmann | 463/16 |
| 2004/0235558 | A1 * | 11/2004 | Beaulieu et al. | 463/20 |
| 2005/0170890 | A1 | 8/2005 | Rowe et al. | |

FOREIGN PATENT DOCUMENTS

| | | | |
|---|---|---|---|
| EP | 0789 338 | A1 | 8/1997 |
| EP | 1 063 622 | A2 | 12/2000 |
| GB | 1 454 046 | | 10/1976 |
| GB | 2 062 922 | | 5/1981 |
| GB | 2 106 293 | A | 9/1981 |
| GB | 2 097 160 | | 10/1982 |
| GB | 2 106 295 | | 4/1983 |
| GB | 2 124 505 | A | 2/1984 |
| GB | 2 165 385 | | 4/1986 |
| GB | 2 243 236 | A | 10/1991 |
| GB | 2 349 494 | A | 11/2000 |
| GB | 2 372 132 | A | 8/2002 |
| JP | 10-071228 | | 3/1998 |
| JP | 2002-262738 | | 9/2000 |
| JP | 2002-113150 | | 4/2002 |
| WO | WO 98/20949 | | 5/1998 |
| WO | WO 99/53454 | A1 | 10/1999 |
| WO | WO 99/64977 | A1 | 12/1999 |
| WO | WO 00/30727 | | 6/2000 |
| WO | WO 00/32286 | A1 | 6/2000 |
| WO | WO 01/51143 | | 7/2001 |

OTHER PUBLICATIONS

"Big Games Safari" Product Sheet, IGT, 24 pages (2000).
"Cabby Cash™" Product Sheet, Anchor Gaming, 2 pages (2000).
"Congo Quest™" Product Sheet, Anchor Gaming, 2 pages (2000).
"Fishin' Buddies™" Product Sheet, Anchor Gaming, 2 pages (2000).
Legato, Frank, "The Full Monty," Strictly Slots, pp. 48-50 (Jun. 1999).
"Goooaal!" Product Sheet, Bally Gaming, Inc., 2 pages (2000).
"Great Whites" Product Sheet, VLC, Inc., 2 pages (2000).
"Jackpot Stampede Deluxe™" Product Sheet, WMS Gaming Inc., 2 pages (1997).
"Loaded Dice" Product Sheet, Konami Gaming, 2 pages (2000).
"Neptune's Pearls" Product Sheet, Unidesa Gaming, 4 pages (1998).
"Penguin Pays" Product Sheet, Aristocrat Incorporated, 2 pages (1998).
"Stroke of Luck™" Product Sheet, WMS Gaming Inc., 2 pages (1997).
"Wild Cougar" Article, Strictly Slots, p. 44 (Feb. 1999).
"Yahtzee® Brand Video Game" Product Brochure, Hasbro, Inc., 2 pages (2000).

* cited by examiner

WAGERING GAME WITH PLAYER-DETERMINED SYMBOL FUNCTION

CROSS-REFERENCE TO RELATED APPLICATIONS

This application claims the benefit of priority of U.S. Provisional Patent Application No. 60/644,223, filed Jan. 14, 2005,which is hereby incorporated by reference in its entirety.

FIELD OF THE INVENTION

The present invention relates generally to gaming terminals for playing a wagering game and, more particularly, to a wagering game having a unique feature to allow a player to select a new function for a symbol.

BACKGROUND OF THE INVENTION

Gaming terminals, such as slot machines, video poker machines, and the like, have been a cornerstone of the gaming industry for several years. Generally, the popularity of such terminals with players is dependent on the likelihood (or perceived likelihood) of winning money at the terminal and the intrinsic entertainment value of the terminal relative to other available gaming options. Where the available gaming options include a number of competing terminals and the expectation of winning at each terminal is roughly the same (or believed to be the same), players are most likely to be attracted to the most entertaining and exciting of the terminals.

Consequently, shrewd operators strive to employ the most entertaining and exciting terminals available because such terminals attract frequent play and, hence, increase profitability to the operator. In the competitive gaming terminal industry, there is a continuing need for gaming terminal manufacturers to produce new types of games, or enhancements to existing games, which will attract frequent play by increasing the entertainment value and excitement associated with the game.

One concept that has been successfully employed to enhance the entertainment value of a game is that of a "secondary" or "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming terminal(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming terminal. If the gaming terminal is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming terminal(s) without winning the jackpot. Further, when several gaming terminals are linked together such that several players at several gaming terminals compete for the same jackpot, the jackpot progressively increases at a much faster rate, which leads to further player excitement.

In existing games, the outcomes are randomly determined and the player does not have any control over the outcome of the game. This can cause players to feel dissatisfied when they lose. Thus, there is a need for a player to be given the feeling that she or he has some control over the selection process.

SUMMARY OF THE INVENTION

In one of the embodiments according to the present invention, a method for playing a wagering game is provided. The method includes conducting a basic game having a randomly selected outcome. The randomly selected outcome is selected from a plurality of outcomes and is indicated by a plurality of symbols. Each of the plurality of symbols has a first function. A side-wager option is presented that allows a player to change a function of a certain one of the plurality of symbols to one of a plurality of second functions. In response to the player selecting the side-wager option, the second function is then selected. The second function is then attributed to the certain one of the plurality of symbols when indicating the randomly selected outcome.

In accordance with another embodiment of the present invention, a gaming terminal for playing a wagering game is provided. The gaming terminal includes a display for displaying a plurality of symbols. The plurality of symbols indicates a randomly selected outcome of the wagering game. An input device for allowing a player to select a function of a selected one of the plurality of symbols is also included. The function is chosen from a plurality of functions. In response to the input device being activated and the randomly selected outcome including the one of the plurality of symbols, the selected function is attributed to the one of the plurality of symbols.

In accordance with yet another embodiment of the present invention, a gaming system is provided. The gaming system includes at least one display and at least one gaming terminal for playing a wagering game. The wagering game has a randomly selected outcome that is indicated by symbol combination derived from a plurality of symbols. The symbol combination is aligned along a payline. Each of the plurality of symbols has a first function. The gaming system also has a controller that is coupled to the at least one gaming terminal and the at least one display. The controller allows the player to change the first function of one of the plurality of symbols to a player-selected function. Also, in response to the player-selected function being selected and the one of the plurality of symbols being part of the symbol combination, the controller performs the player-selected function.

According to one embodiment, a method for playing a wagering game is provided. The method includes conducting a basic game having a randomly selected outcome. The randomly selected outcome is selected from a plurality of outcomes and is indicated by a plurality of symbols having a first function. A side-wager option is presented. The side-wager option can change a function of a certain one of the plurality of symbols to one of a plurality of second functions. In response to the player selecting the side-wager option, the one of the plurality of second functions is selected. Each of the plurality of second functions having a purchase amount. The second function is attributed to the certain one of the plurality of symbols when indicating the randomly selected outcome.

The purchase amount of each of the plurality of second functions is based upon a change of an expected value of the wagering game resulting from the use of the selected one of the plurality of second functions.

According to another embodiment of the present invention, a gaming terminal for playing a wagering game is provided. The gaming terminal includes a display displaying a plurality of symbols that indicate a randomly selected outcome of the wagering game. An input device for allowing a player to select a function of a selected one of the plurality of symbols is also included. The function is chosen from a plurality of functions, such that the number of the plurality of functions presented to the player varies depending on a predetermined criteria. In response to the input device being activated and the randomly selected outcome including the selected one of the plurality of symbols, the selected function is attributed to the one of the plurality of functions.

According to yet another embodiment of the present invention, a gaming system is provided that includes at least one display. The system also includes at least one gaming terminal for playing a wagering game having a randomly selected outcome being indicated by a symbol combination derived from a plurality of symbols. The symbol combination is aligned along a payline and the plurality of symbols each have a first function. A controller is coupled to the at least one gaming terminal and the at least one display. The controller is operative to allow a player to change the first function of one of the plurality of symbols to a player-selected function. The controller is adapted to assign a purchase amount to the player-selected function that is based upon a change of an expected value of the wagering game resulting from the use of the player-selected function. In response to the player selecting the player-selected function of the one of the plurality of symbols and the one of the plurality of symbols being a part of the symbol combination, the controller is operative to perform the player-selected function.

The above summary of the present invention is not intended to represent each embodiment or every aspect of the present invention, as there are several novel methods and gaming terminals incorporating this communication feature. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
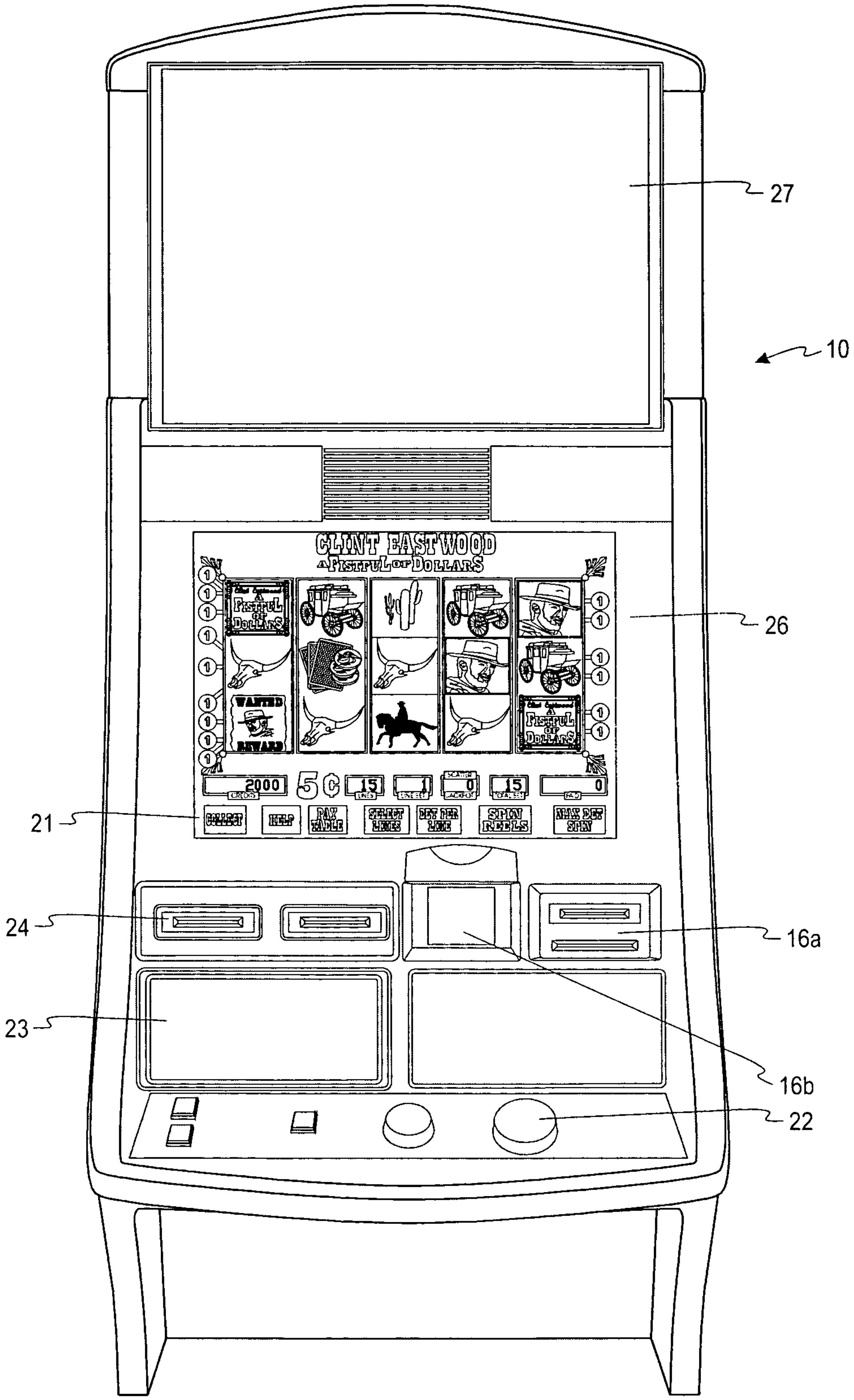
FIG. 1 illustrates a gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor 16*a* and a cash wager accepter 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

Also included is the payout mechanism 23, which performs the reverse functions of the wager acceptor 16. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter his or her PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
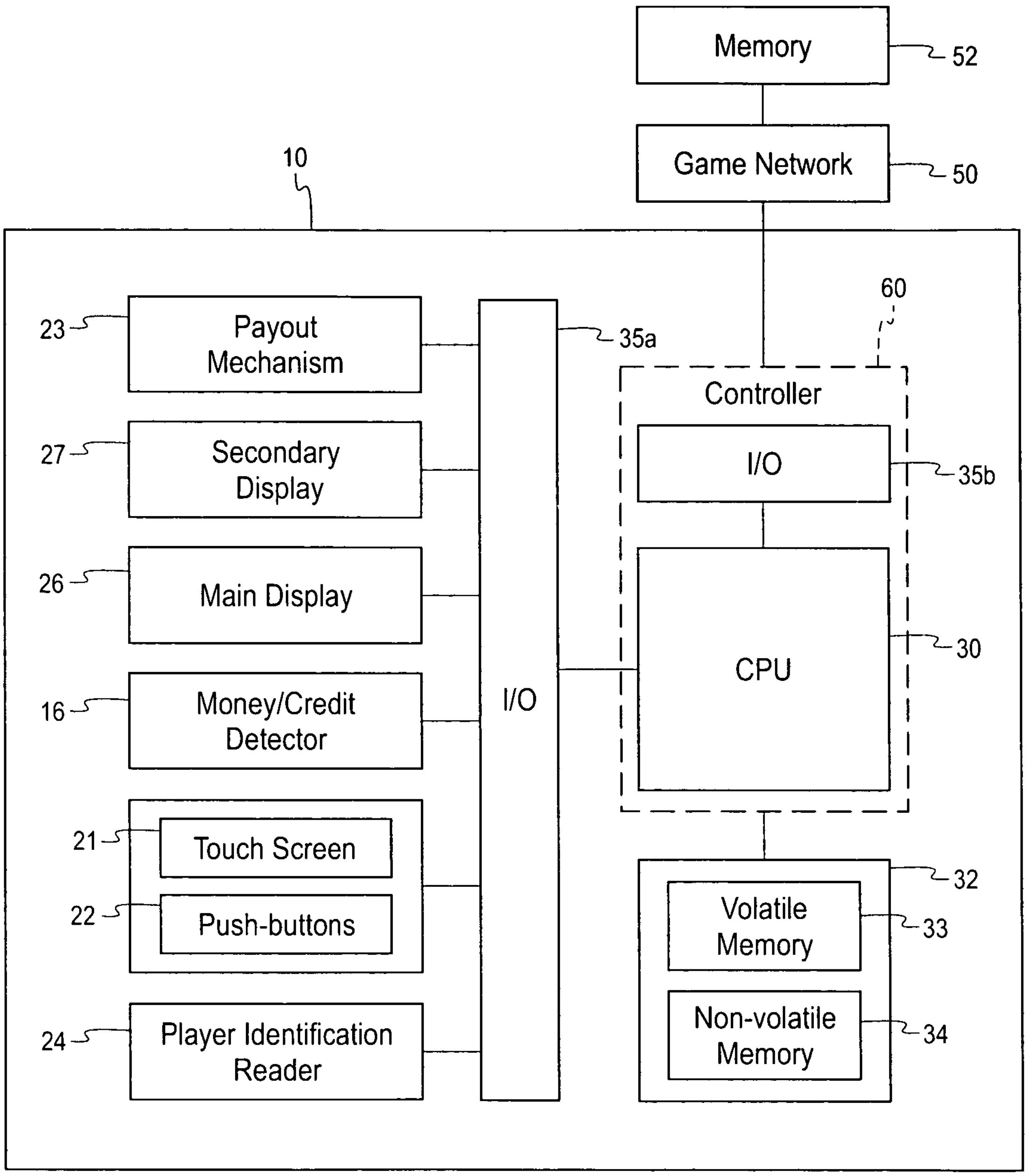
FIG. 2 illustrates a control system that is used in conjunction with the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via I/O circuits 35*b*. Although the I/O circuits 35*a*, 35*b* may be shown as single blocks, it should be appreciated that the I/O circuits 35*a*, 35*b* may include a number of different types of I/O circuits.

The gaming terminal 10 is typically operated as part of a game control network 50 having control circuitry and memory devices. The game control network 50 may optionally include a system memory 52 for alternative storage of data. The game control network 50 may include instructions for playing games, such as progressive jackpots that are contributed to by all or some of the gaming terminals 10 in the network 50. The gaming terminal 10 often has multiple serial ports, each port dedicated to providing data to a specific host computer system that performs a specific function (e.g., account system, player-tracking system, progressive game control system, etc. . . . ). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the advantages of the RS-485 capability (e.g., multi-drop capability that allows many gaming terminals 10 to communicate with the game control network 50). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection to the game control network 50.

The gaming terminal 10 and associated game control network 50 are capable of executing wagering games on or through a controller 60. Controller 60, as used herein, comprises any combination of hardware, software, and/or firmware that may be disposed or resident inside and/or outside of a gaming terminal 10 or like machine which may communicate with and/or control the transfer of data between the gaming terminal and a bus, another computer, processor, or device, and/or a service and/or a network. The network may include, but is not limited to a peer-to-peer, client/server, master/slave, star network, ring network, bus network, or other network architecture wherein at least one processing device (e.g., computer) is linked to at least one other processing device. The controller 60 may comprise the I/O circuits 35*b* and the CPU 30. In other embodiments, the CPU 30 may be housed outside of the controller 60, and a different processor may be housed within the controller 60. The controller 60, as used herein, may comprise one or more controllers. In one implementation, each gaming terminal 10 comprises, or is connected to, a controller 60, enabling each gaming terminal 10 to transmit and/or receive signals, preferably both, in a peer-to-peer arrangement. In another example, the controller 60 may be adapted to facilitate communication and/or data transfer for one or more gaming terminals 10 in a client/server or centralized arrangement. In one aspect, shown in FIG. 2, the controller 60 may connect the gaming terminal 10 via a conventional I/O port and communication path (e.g. serial, parallel, IR, RC, 10bT, etc.) to the game control network 50, which may include, for example, other gaming terminals connected together in the game control network 50.

Figure 3:
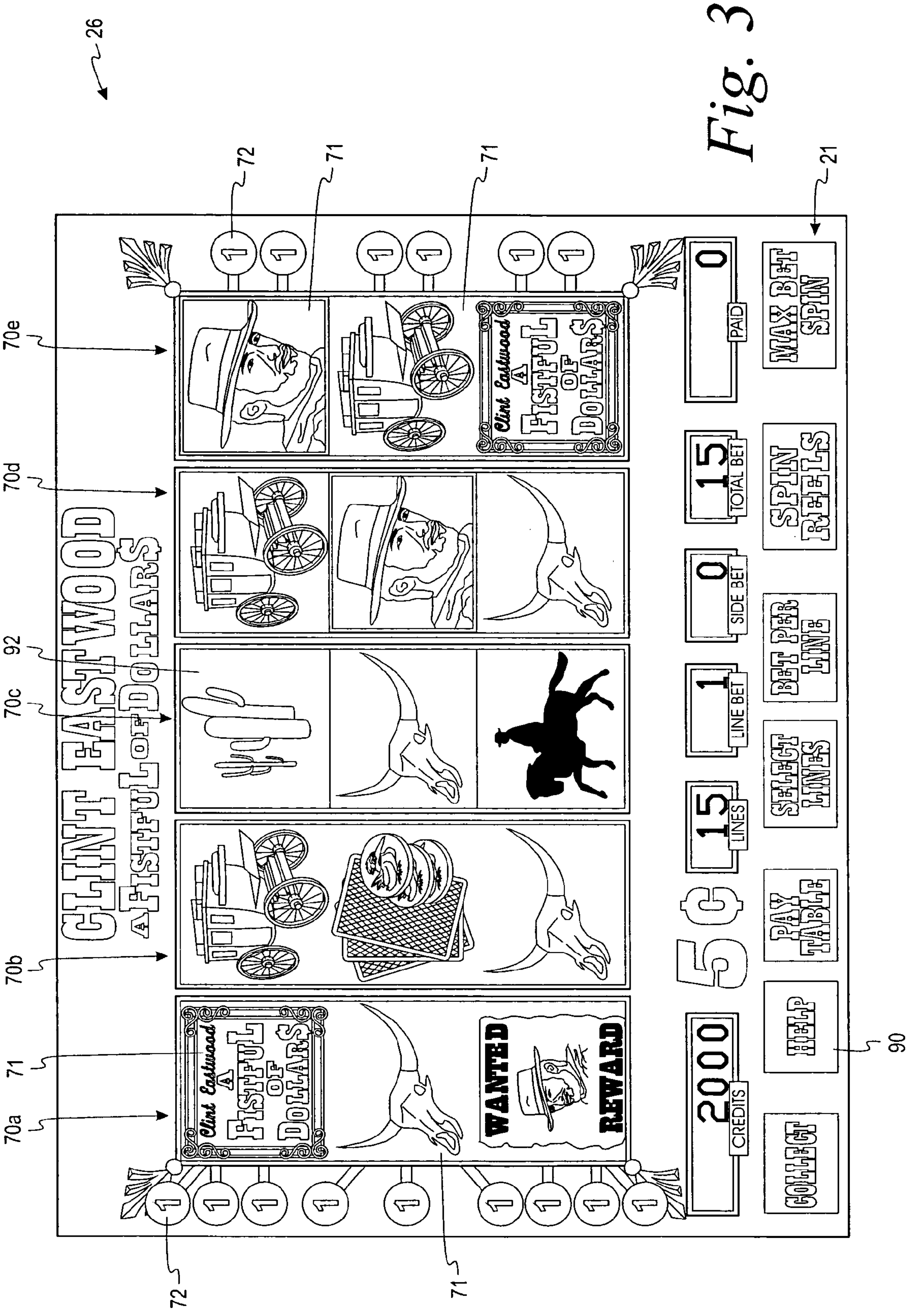
FIG. 3 illustrates an initial screen of the main display of the gaming terminal of FIG. 1.

FIG. 3 illustrates the main display 26 of the gaming terminal 10, which includes a plurality of reels 70*a-e*. The reels 70*a-e* include a plurality of symbols 71 that are used to indicate a randomly selected outcome of the wagering game. A plurality of paylines 72 traverses the reels 70*a-e* in a horizontal or zigzag arrangement. A player selects one or more of the paylines 72 and the selected paylines become "active" paylines.

In the present example, the wagering game shown is "A FISTFUL OF DOLLAR$," where the symbols 71 include various things associated with the "Old West," such as cactuses, carriages, wanted posters, etc. In accordance with the present invention, prior to the beginning of the game, an interactive pop-up window 74 (FIG. 4) provides the player with an option to make a side-wager.

Figure 4:
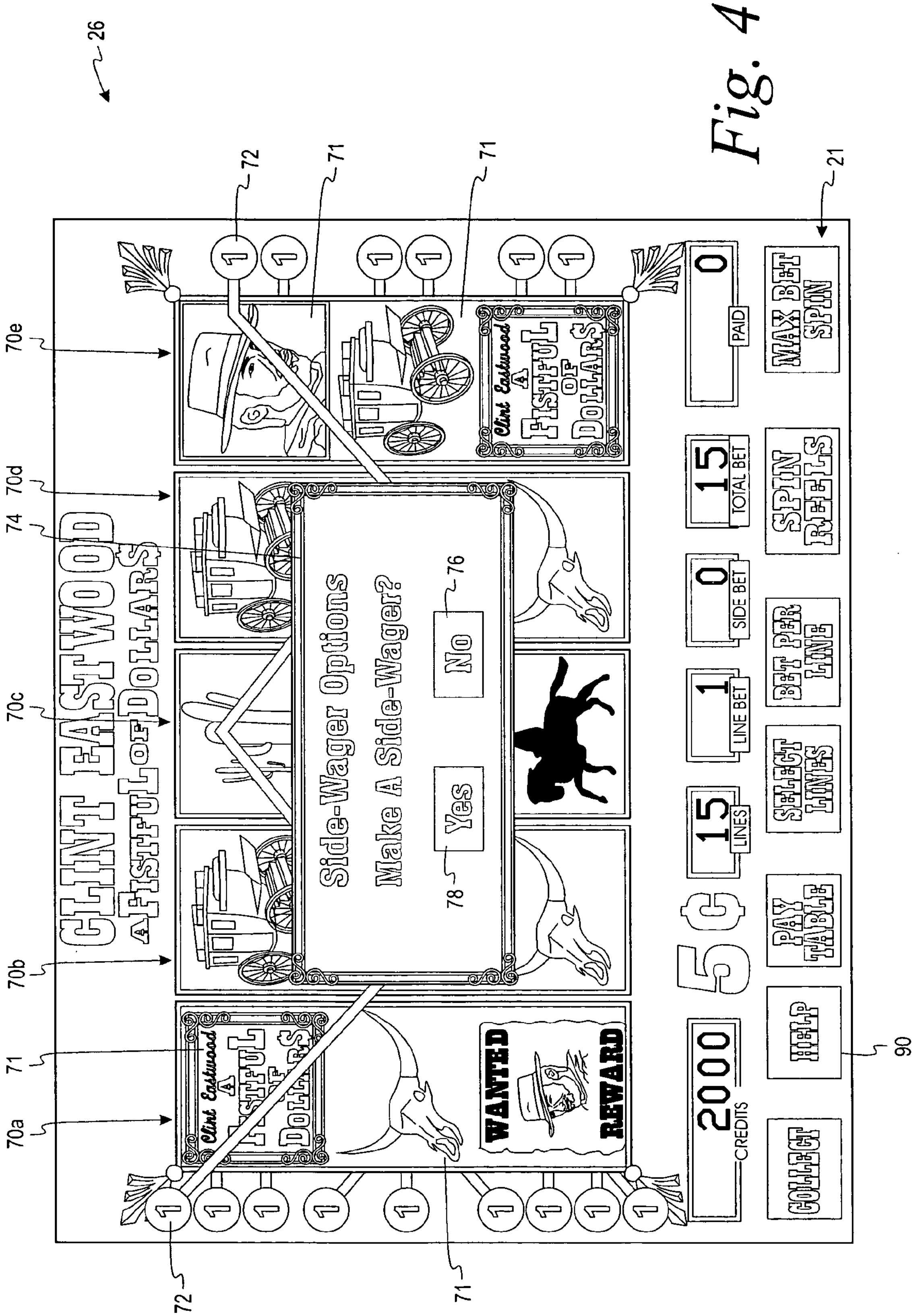
FIG. 4 illustrates a first pop-up window on the main display of the gaming terminal of FIG. 1.

As shown in FIG. 4, the pop-up window 74 provides the player with an option to make a side-wager. The side-wager will allow the player to change the function of a particular symbol 80 (FIG. 5) during the basic wagering game. Should the player decline to make the side-wager by activating the "no" symbol 76 in the pop-up window 74 (or by activating a corresponding button on the push button panel 22), the pop-up window 74 disappears and the game returns to the basic wagering game as shown in FIG. 3.

Figure 5:
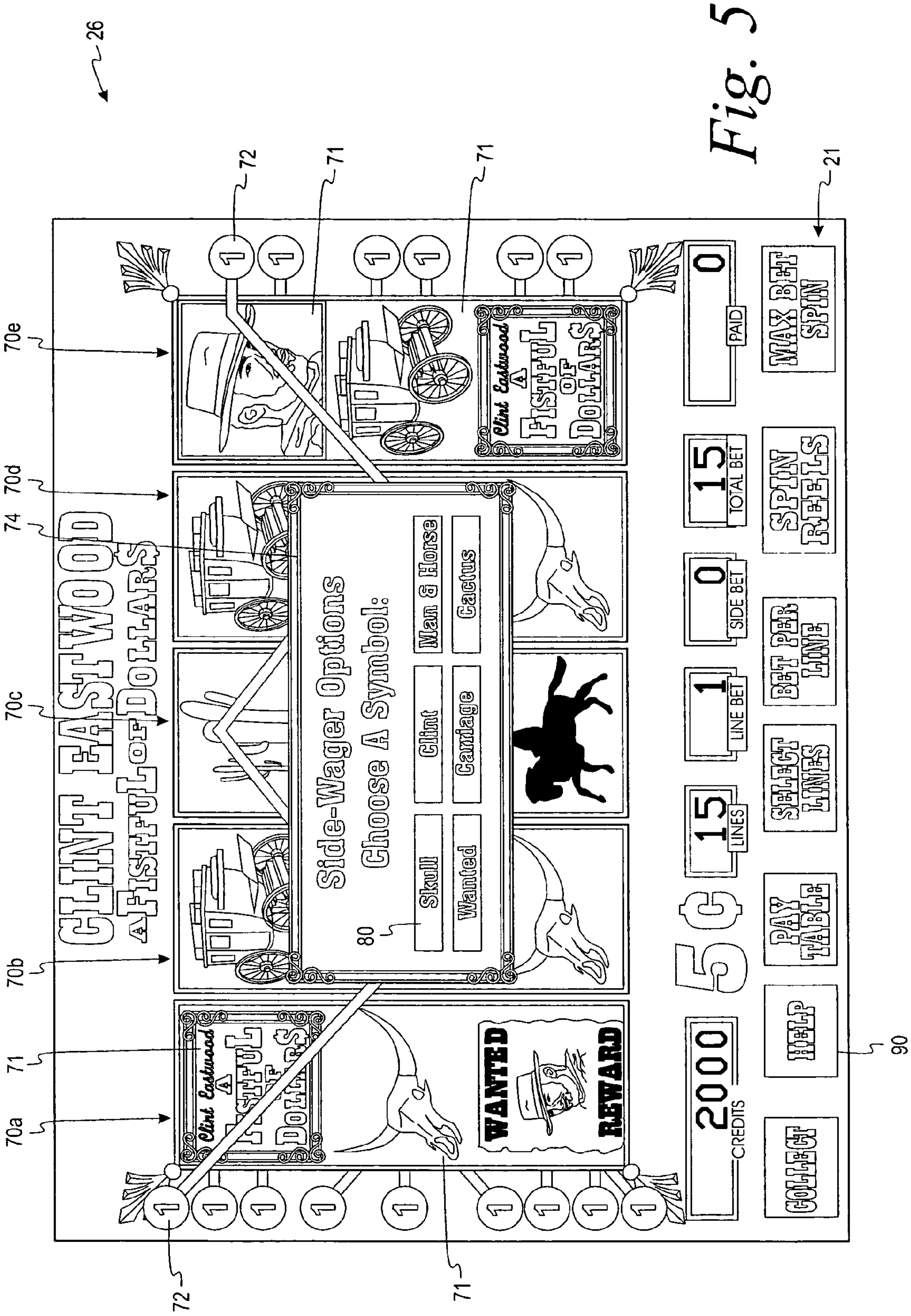
FIG. 5 illustrates a second pop-up window on the main display of the gaming terminal of FIG. 1.

If the player decides to make a side-wager, the player can either activate the "yes" button 78 on the pop-up window 74 or activate a corresponding button on the push button panel 22 (FIG. 1). Once activated, the pop-up window 74 reveals to the player another set of choices, as shown in FIG. 5. The player is given a choice of symbols 80. Each of the symbols 80 corresponds to one of the symbols 71 on the reels 70*a-e* (e.g., the symbol 80 may be the same as the symbol 71 on the main display 26 or the symbol 80 may be a word representing the symbol 71). The player is allowed to select the symbol 80 (corresponding to the reel symbol 71) he or she wishes to have assigned a new function. The player will be changing the function of the reel symbol 71 corresponding to the selected symbol 80. In some embodiments, the player may not be given the choice as to which symbol he or she wishes to change. In those embodiments, the gaming terminal 10 may randomly select the symbol or it may always be a single symbol that changes. In other embodiments, the player may be able to change groups of symbols. For example, in a wagering game based upon playing cards, the player may be able to select all face cards or all numbered cards (or a predetermined amount of the numbered cards).

Figure 6:
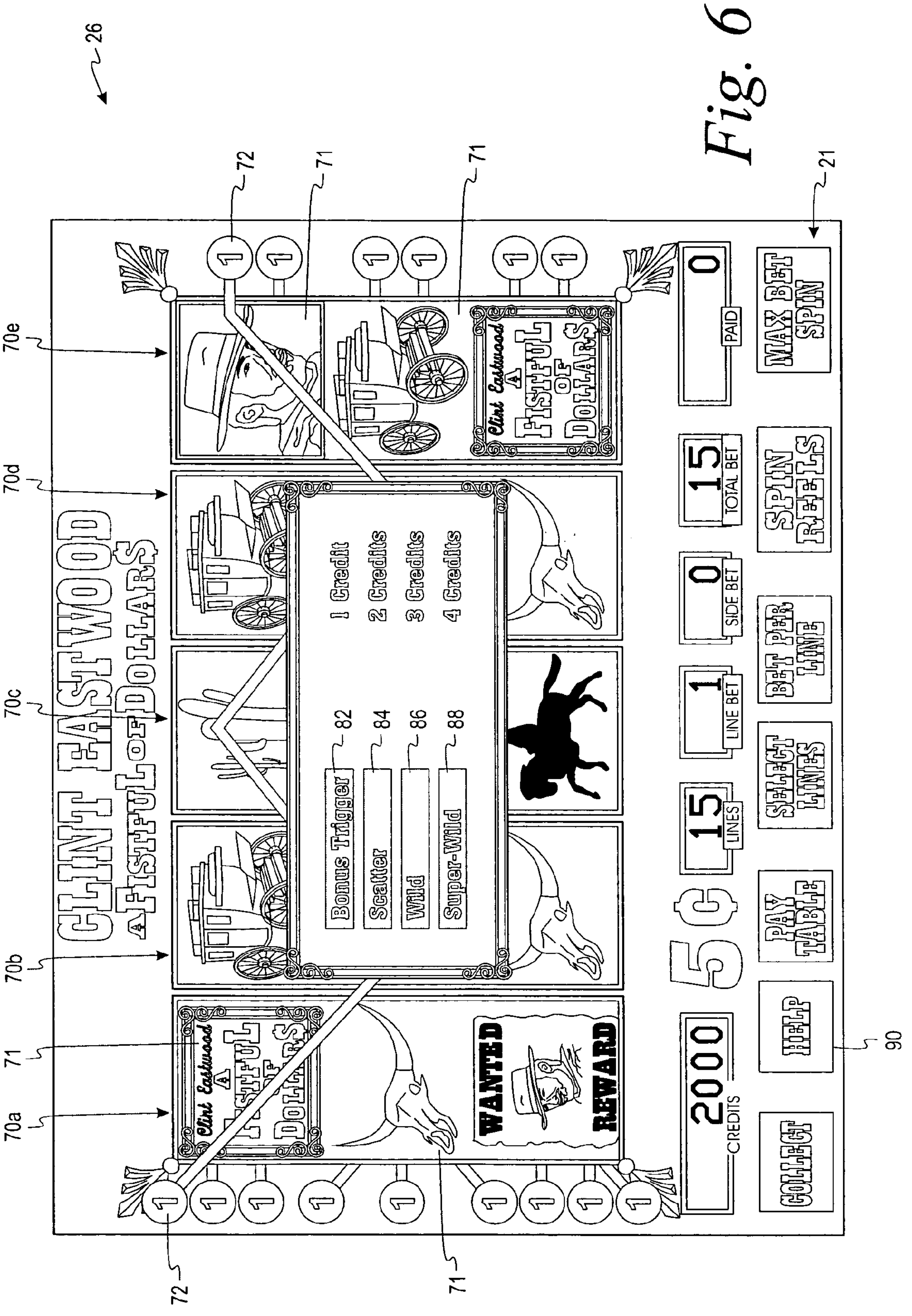
FIG. 6 illustrates a third pop-up window on the main display of the gaming terminal of FIG. 1.

After making the symbol-selection, as shown in FIG. 6, the player is now able to select the function he or she would like to assign to the selected symbol 80. Each of these selections allows the player to select a new function for the symbol that was selected on the pop-up window 74. In the present embodiment, there are four selections: a bonus trigger 82, a scatter 84, a wild 86, and a super-wild 88. Each has a different function: the bonus trigger symbol 82 triggers the bonus game; the scatter symbol 84 causes a special jackpot or scatter bonus award if one or more of a certain type of symbol appears anywhere on the main display 26 of the gaming terminal 10, regardless of whether it is located on an active payline; the wild symbol 86 acts as a wild; and the super-wild symbol 88 creates an expanding wild symbol that extends across the displayed portion of the corresponding reel, and acts as a wild in all three spots. In other embodiments, other functions that could be purchased. Some of these include a multiplying wild that is a wild symbol that doubles or triples plays; a re-spin that allows the player to re-spin the reels when two or more of the symbols appear on either the main display 26 or on an active playline; extra wild function that adds additional wild symbols to the main display 26 whenever a wild symbol appears on an active payline; and a nudge function that nudges the reel (or reels) to another spot. Other functions could be included as well.

As shown in FIG. 6, each of the different symbols has a different purchase amount. Generally, the purchase amounts are based upon the increase in the wagering game's expected value (EV) when a certain function is assigned to the symbol. The EV is the award amount times the probability of winning. As the EV increases, so does the wager amount. If multiple functions have the same EV, then the wager amount for those functions would be the same.

Once the player selects the new function, the gaming terminal 10 returns to the basic game as shown in FIG. 3, and the player spins the reels. If the reel symbol 71 that corresponds to the selected symbol 80 appears on the main display 26, the corresponding reel symbol 71 morphs into the selected side-wager symbol and the function of that selected symbol 80 changes to the function of the selected side-wager symbol 82-88. For some of the functions, the corresponding reel symbols 71 have to be on an active payline to activate the function. For example, the bonus trigger and wild symbol functions are only activated when the corresponding reel symbol 71 is on an active payline. The function of the scatter symbol and expanding wild symbol, however, are active as long as the corresponding reel symbol is present on the main display 26. Changing the function of the corresponding reel symbols 71 increases the player's perception of winning and can cause the player to have a greater enjoyment of the game.

In some embodiments, the player may need to place a minimum wager prior to being eligible to place the side-wager. For example, the player may need to place the maximum wager amount on all fifteen paylines in order to be eligible for the side-wager.

In other embodiments, the amount of the wager (and/or number of paylines played) may affect the types of functions that are offered to the player. In these embodiments, the more the basic game wager, the more options the player may be given. Alternatively, the amount of the wager may decrease the cost of the side-wager. For example, if a player only wagers two credits on one payline, the bonus-trigger side-wager may cost three credits. However, the same side-wager may only cost one credit if the player had placed a maximum wager on all fifteen paylines.

In some embodiments, the gaming terminal 10 may include a help button 90 (FIG. 4). The help button 90 could cause the pop-up window 74 to display information describing the selection of functions, the wagering information, and any other information with which the players may need assistance.

Figure 7:
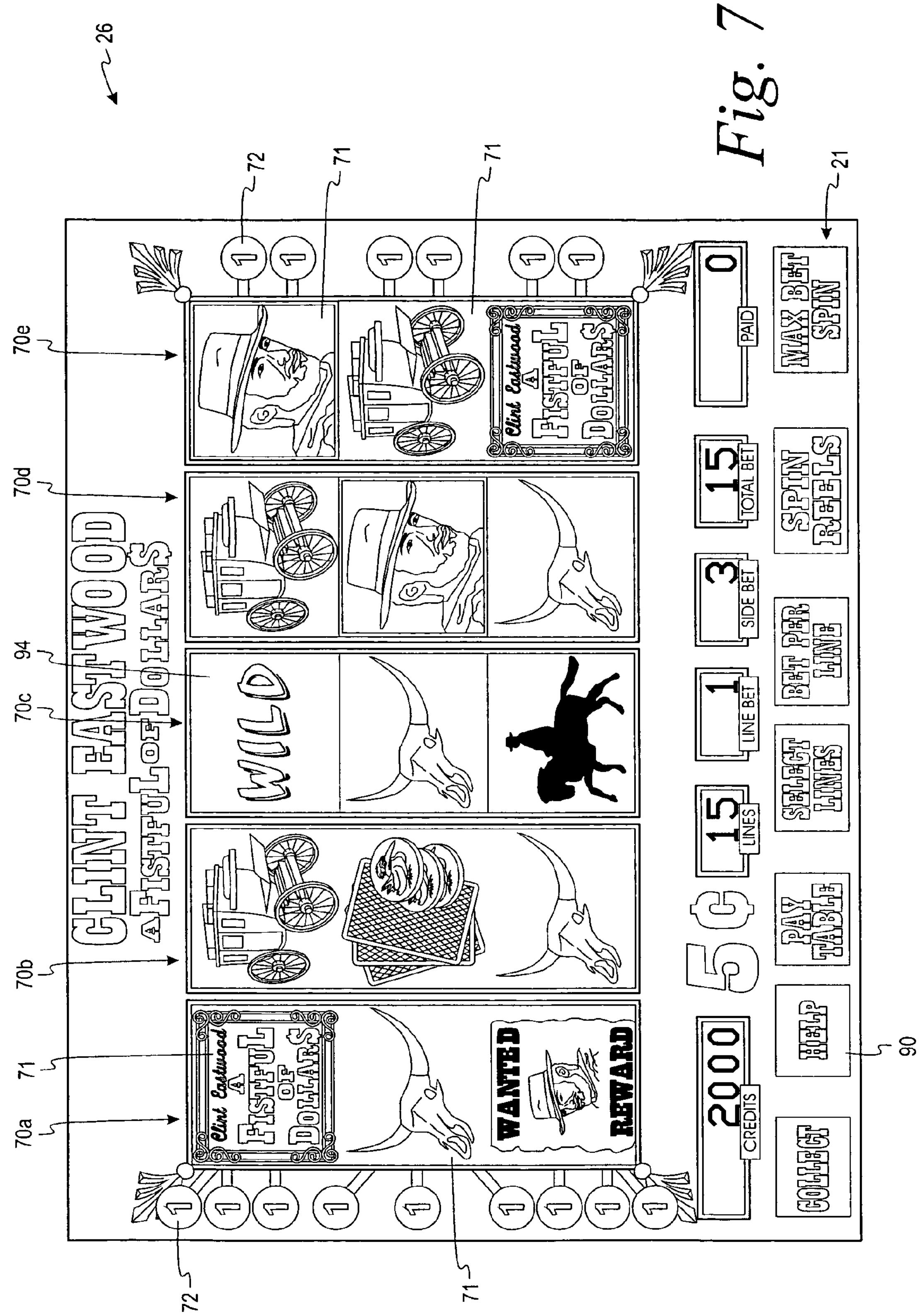
FIG. 7 illustrates a screen of the main display of the gaming terminal of FIG. 1 after a side-wager has been selected.

As an example of one embodiment of the present invention, assume that the player has chosen to make a side-wager of three credits to make the cactus symbol into a wild. If, after the spin, the resultant screen is the main display 26 of FIG. 3. The cactus symbol 92 shown on the third reel 70*c* will morph into a wild symbol 94, as shown in FIG. 7. The function of the symbol also changes from the function of a regular reel symbol to the wild function. If the player has activated the payline that includes the five symbols in the first row, that payline now includes three carriages in a row, and is a winning payline. The player now would receive the credit amount according to that winning combination.

In some embodiments, the side-wager may only last for a single spin. In other embodiments, the side-wager may last for a predetermined number of spins or for a predetermined amount of time. In other embodiments, the side-wager may continue spin after spin until the player decides to turn it off. In embodiments having a side-wager on/off feature, when the side-wager option is "on," every time the player spins the reels 70*a*-*e*, the amount of the side-wager would be deducted from the player.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method for playing a wagering game, the method comprising:

conducting a basic game having a randomly selected outcome via a processor, the randomly selected outcome being selected from a plurality of outcomes and being indicated by a plurality of symbols having a first function;

presenting a side-wager option via a display, the side-wager option changing a function of a certain one of the plurality of symbols to one of a plurality of second functions;

in response to the player selecting the side-wager option, selecting the one of the plurality of second functions, each of the plurality of second functions having a purchase amount; and attributing the second function to the certain one of the plurality of symbols when indicating the randomly selected outcome;

wherein the purchase amount of each of the plurality of second functions is based upon a change of an expected value of the wagering game resulting from the use of the selected one of the plurality of second functions.

2. The method of claim 1, wherein the presenting comprises presenting a plurality of side-wager options, each of the plurality of side-wager options corresponding to a different one of the plurality of second functions.

3. The method of claim 2, wherein each of the plurality of side-wagers has a purchase amount.

4. The method of claim 3, wherein each of the plurality of side-wagers has the same purchase amount.

5. The method of claim 1 wherein the selecting the one of the plurality of second functions is performed by the player.

6. The method of claim 1 wherein the selecting the one of the plurality of second functions is delegated by the player to a gaming terminal.

7. The method of claim 1, wherein the conducting step comprises activating at least one of a plurality of paylines to play and choosing a wager amount for each of the plurality of paylines chosen.

8. The method of claim 7, wherein the presenting step only occurs if at least a predetermined number of the plurality of paylines are activated.

9. The method of claim 7, wherein the presenting step only occurs if at least a predetermined wager is placed on each of the plurality of paylines played.

10. A gaming terminal for playing a wagering game, comprising:

a display displaying a plurality of symbols that indicate a randomly selected outcome of the wagering game; and an input device for allowing a player to select a function for a selected one of the plurality of symbols, the function being chosen from a plurality of functions, wherein the number of the plurality of functions presented to the player varies depending on a predetermined criteria;

wherein, in response to the input device being activated and the randomly selected outcome including the selected one of the plurality of symbols, the selected function is attributed to only the selected one of the plurality of symbols included in the randomly selected outcome.

11. The gaming terminal of claim 10 wherein the plurality of functions includes at least one of a bonus-trigger function, a progressive-game-trigger function, a wild-function, a scatter function, an expanding-wild function, a multiplying-wild function, a re-spin function, an extra wild function, and a nudge function.

12. The gaming terminal of claim 10 wherein each of the plurality of functions increases the expected value of the wagering game.

13. The gaming terminal of claim 10 wherein all of the plurality of functions increase the expected value of the wagering game by the same amount.

14. The gaming terminal of claim 10 wherein the input device is included in a pop-up menu on the display.

15. The gaming terminal of claim 14 wherein the pop-up menu displays a plurality of symbols to select.

16. The gaming terminal of claim 10 wherein predetermined criteria is a wager amount or a number of pay lines played.

17. A gaming system comprising:

at least one display;

at least one gaming terminal for playing a wagering game having a randomly selected outcome being indicated by a symbol combination derived from a plurality of symbols, the symbol combination being aligned along a payline and the plurality of symbols each having a first function; and a controller coupled to the at least one gaming terminal and the at least one display, the controller operative to (i) allow a player to change the first function of one of the plurality of symbols to a player-selected function and the controller is adapted to assign a purchase amount to the player-selected function that is based upon a change of an expected value of the wagering game resulting from the use of the player-selected function, and (ii) in response to the player selecting the player-selected function of the one of the plurality of symbols and the one of the plurality of symbols being a part of the symbol combination, perform the player-selected function and change the appearance of the one of the plurality of symbols being a part of the symbol combination.

18. The gaming system of claim 17 wherein the display is part of the gaming terminal.

19. The gaming system of claim 17 wherein the controller is external to the gaming terminal.

20. The gaming system of claim 17, wherein the player-selected function is one of a plurality of functions presented by the controller.

21. The method of claim 1, further comprising in response to the player selecting the side-wager option, offering the player the opportunity to select the certain one of the plurality of symbols.

* * * * *